(12) United States Patent
Linton et al.

(10) Patent No.: US 12,549,069 B2
(45) Date of Patent: Feb. 10, 2026

(54) DRIVE UNIT HAVING A ROTOR SHAFT (71) Applicant: Schaeffler Technologies AG & Co. KG, Herzogenaurach (DE)

(72) Inventors: Daniel Linton, North Canton, OH (US); Kyle Nelson, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 324 days.

(21) Appl. No.: 18/310,203

(22) Filed: May 1, 2023

(65) Prior Publication Data
US 2024/0372439 A1 Nov. 7, 2024

(51) Int. Cl.
*H02K 9/19* (2006.01)
*H02K 1/22* (2006.01)
*H02K 7/00* (2006.01)

(52) U.S. Cl.
CPC ............... *H02K 9/19* (2013.01); *H02K 1/22* (2013.01); *H02K 7/003* (2013.01)

(58) Field of Classification Search
CPC .......... H02K 1/28; H02K 7/003; H02K 7/083; H02K 7/085; H02K 7/086; H02K 7/09; H02K 9/19
See application file for complete search history.

(56) References Cited

U.S. PATENT DOCUMENTS

| | | | |
|---|---|---|---|
| 8,485,798 B2 | 7/2013 | Sheth et al. | |
| 8,707,692 B1 | 4/2014 | Hauser | |
| 10,710,428 B2 | 7/2020 | Klinkhammer | |
| 2018/0351434 A1* | 12/2018 | Knoblauch | H02K 1/32 |
| 2020/0076257 A1 | 3/2020 | Piazza Galarza et al. | |
| 2020/0378281 A1* | 12/2020 | Tomescu | B64D 33/08 |
| 2022/0060072 A1* | 2/2022 | Michael | H02K 9/19 |

(Continued)

FOREIGN PATENT DOCUMENTS

| | | | | |
|---|---|---|---|---|
| CN | 106795921 A | | 5/2017 | |
| DE | 112015001275 T5 | * | 1/2017 | ............... H02K 1/32 |
| DE | 102017128551 A1 | * | 6/2019 | |

(Continued)

OTHER PUBLICATIONS

18310203_2025-05-07_DE_102017128551_A1_H.pdf (Year: 2025).*
18310203_2025-05-07_DE_102020121724_A1_H.pdf (Year: 2025).*
18310203_2025-05-07_DE_112015001275_T5_H.pdf (Year: 2025).*

*Primary Examiner* — Christopher M Koehler
*Assistant Examiner* — Ahmed F Seck
(74) *Attorney, Agent, or Firm* — Price Heneveld LLP (57) ABSTRACT

A drive unit includes a motor and a rotor shaft operably coupled with the motor. The rotor shaft has an inner surface that defines a hollow that extends axially from a first opening at a first end of the rotor shaft to a second opening at a second end of the rotor shaft and has a tapered portion that tapers radially inboard as the tapered portion of the inner surface extends axially away from the second end of the rotor shaft. The rotor shaft further defines a plurality of ports disposed axially between the tapered portion and the second end of the rotor shaft. The motor is configured to drive rotation of the rotor shaft, such that a fluid disposed within the hollow is propelled axially away from the first end of the rotor shaft and through the plurality of ports defined by the rotor shaft.

19 Claims, 9 Drawing Sheets

(56) References Cited

U.S. PATENT DOCUMENTS

2022/0302795 A1\*   9/2022   Barden ................... H02K 1/32
2022/0320948 A1   10/2022   Cripsey et al.

FOREIGN PATENT DOCUMENTS

| DE | 102020121724 A1 * | 2/2022 |
|----|-------------------|--------|
| ES | 2589608 T3 | 11/2016 |
| JP | 2632892 B2 | 7/1997 |
| WO | 2022180875 A1 | 9/2022 |

\* cited by examiner

DRIVE UNIT HAVING A ROTOR SHAFT

FIELD OF THE DISCLOSURE

The present disclosure generally relates to a drive unit that includes a rotor shaft. More specifically, the present disclosure relates to a drive unit that includes a rotor shaft having an inner surface that includes a tapered portion that is configured to convey a fluid within a hollow defined by the inner surface during rotation of the rotor shaft.

BACKGROUND OF THE DISCLOSURE

Electric drive units generally define fluid circuits for fluid, such as oil, that lubricate and cool various components within electric drive units. An electric drive unit that efficiently circulates fluid within the fluid circuit with minimal components may be desirable.

SUMMARY OF THE DISCLOSURE

According to a first aspect of the present disclosure, a drive unit includes a motor and a rotor shaft operably coupled with the motor. The rotor shaft has an inner surface that defines a hollow that extends axially from a first opening at a first end of the rotor shaft to a second opening at a second end of the rotor shaft and has a tapered portion that tapers radially inboard as the tapered portion of the inner surface extends axially away from the second end of the rotor shaft. The rotor shaft further defines a plurality of ports disposed axially between the tapered portion and the second end of the rotor shaft. The motor is configured to drive rotation of the rotor shaft, such that a fluid disposed within the hollow is propelled axially away from the first end of the rotor shaft and through the plurality of ports defined by the rotor shaft.

Embodiments of the first aspect of the disclosure can include any one or a combination of the following features:
  the rotor shaft includes a first shaft component having a first end and a second end opposite the first end of the first shaft component and defining a first hollow, wherein the first end of the first shaft component is the first end of the rotor shaft and the first hollow defined by the first shaft component is a portion of the hollow defined by the rotor shaft, and a second shaft component coupled to the first shaft component and having a first end and a second end opposite the first end of the second shaft component and defining a second hollow, wherein the second end of the second shaft component is the second end of the rotor shaft and the second hollow defined by the second shaft component is a portion of the hollow defined by the rotor shaft;
  the tapered portion of the inner surface of the rotor shaft is a portion of an inner surface of the first shaft component;
  the tapered portion extends along a majority of the axial length of the first shaft component;
  the first shaft component includes a lip positioned between the first end of the first shaft component and the tapered portion of the inner surface of the first shaft component, wherein the lip extends radially inboard farther than the radially inboard-most portion of the tapered portion of the inner surface of the first shaft component;
  the second shaft component includes an outer surface that is opposite an inner surface of the second shaft component, and a portion of the outer surface of the second shaft component is radially inboard of and axially aligned with a portion of the inner surface of the first shaft component, and the plurality of ports are defined at least partially by the outer surface of the second shaft component and extend from a corresponding plurality of inlets positioned within the first hollow to a corresponding plurality of outlets outside of the first hollow, such that the first hollow and an exterior environment of the rotor shaft are in fluid communication via the plurality of ports;
  the second end of the first shaft component that defines the second opening of the first shaft component is welded to a portion of the outer surface of the second shaft component that extends between at least two adjacent ports of the plurality of ports to fix the second shaft component to the first shaft component;
  the tapered portion extends axially away from the first end of the first shaft component to a shelf of the inner surface of the first shaft component that extends radially outboard from the tapered portion;
  the first end of the second shaft component abuts the shelf; and
  the second shaft component defines a plurality of inlets of the plurality of ports in the form of apertures defined wholly by the second shaft component.

According to a second aspect of the present disclosure, a method of circulating fluid within a fluid circuit of a drive unit includes the step of actuating a motor of the drive unit to drive rotation of a rotor shaft. The rotor shaft includes an inner surface that defines a hollow that extends axially from a first opening at a first end of the rotor shaft to a second opening at a second end of the rotor shaft. The rotor shaft also includes a tapered portion that tapers radially inboard as the tapered portion of the inner surface extends axially away from the second end of the rotor shaft. The rotor shaft further defines a plurality of ports disposed axially between the tapered portion and the second end of the rotor shaft. The method of circulating fluid within a fluid circuit of a drive unit further includes the step of propelling fluid along the tapered portion of the inner surface of the rotor shaft axially away from the first end of the rotor shaft to the plurality of ports via rotation of the rotor shaft, such that the fluid within the hollow defined by the inner surface is circulated within a fluid circuit of the drive unit by flowing out of the hollow through the plurality of ports and subsequently back into the hollow through the first opening at the first end of the rotor shaft.

Embodiments of the second aspect of the disclosure can include any one or a combination of the following features:
  the rotor shaft includes a first shaft component having a first end and a second end opposite the first end of the first shaft component and defining a first hollow, wherein the first end of the first shaft component is the first end of the rotor shaft and the first hollow is a portion of the hollow defined by the rotor shaft, and a second shaft component having a first end and a second end opposite the first end of the second shaft component and defining a second hollow, wherein the second end of the second shaft component is the second end of the rotor shaft and the second hollow is a portion of the hollow defined by the rotor shaft, and wherein the tapered portion of the inner surface of the rotor shaft is a portion of the inner surface of the first shaft component, such that the step of propelling fluid along the tapered portion of the inner surface of the rotor shaft includes propelling fluid along the tapered portion of the inner surface of the first shaft component axially away from the first end of the first shaft component;

the first end of the second shaft component is disposed within the first hollow, and the portion of the second shaft component that is disposed within the first hollow at least partially defines a plurality of inlets of the corresponding plurality of ports defined by the rotor shaft, such that, in the step of propelling fluid along the tapered portion of the inner surface of the rotor shaft axially away from the first end of the rotor shaft to the plurality of ports via rotation of the rotor shaft, the fluid is propelled into the plurality of ports through the corresponding plurality of inlets at least partially defined by the portion of the second shaft component that is disposed within the first hollow;

the flow rate of the fluid within the fluid circuit is dependent upon the rate of rotation of the rotor shaft; and the drive unit does not include a secondary pump for propelling the fluid along the fluid circuit.

According to a third aspect of the present disclosure, a rotor shaft for an electric drive unit includes a first shaft component that extends axially from a first end to a second end opposite the first end. The first shaft component has an inner surface that defines a first hollow that extends from a first opening defined at the first end of the first shaft component to a second opening defined at the second end of the first shaft component. The inner surface includes a tapered portion that extends along a majority of the axial length of the first shaft component and tapers radially inboard as the tapered portion of the inner surface extends axially away from the second end of the first shaft component. The rotor shaft further includes a second shaft component that extends axially from a first end to a second end opposite the first end. The second shaft component has an inner surface that defines a second hollow that extends between the first end of the second shaft component and the second end of the second shaft component and an outer surface opposite the inner surface of the second shaft component that at least partially defines a plurality of ports. The first end of the second shaft component is inserted into the first hollow through the second opening of the first shaft component, such that a portion of the outer surface of the second shaft component is radially inboard of and axially aligned with a portion of the inner surface of the first shaft component. The plurality of ports defined at least partially by the outer surface of the second shaft component extend from a corresponding plurality of inlets positioned within the first hollow to a corresponding plurality of outlets outside of the first hollow such that the first hollow and an exterior environment of the rotor shaft are in fluid communication via the plurality of ports. The second end of the first shaft component that defines the second opening of the first shaft component is welded to a portion of the outer surface of the second shaft component that extends between at least two adjacent ports of the plurality of ports to fix the second shaft component to the first shaft component.

Embodiments of the third aspect of the disclosure can include any one or a combination of the following features:

the tapered portion extends axially away from the first end of the first shaft component to a shelf of the inner surface of the first shaft component that extends radially outboard from the tapered portion;

the first end of the second shaft component abuts the shelf;

the second shaft component defines a plurality of inlets of the plurality of ports in the form of apertures defined wholly by the second shaft component; and the first shaft component further includes a lip positioned between the first end of the first shaft component and the tapered portion of the inner surface of the first shaft component, wherein the lip extends radially inboard farther than the radially inboard-most portion of the tapered portion of the inner surface of the first shaft component.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. The term "circumferential" and derivatives thereof, such as "circumferentially," shall be understood in relation to the axis of the aforementioned rotor shaft.

Referring now to FIGS. 1-9, a drive unit 10 includes a motor 12 and a rotor shaft 14 that is operably coupled with the motor 12. The rotor shaft 14 includes an inner surface 16 that defines a hollow 18. The hollow 18 extends axially from a first opening 20 at a first end 22 of the rotor shaft 14 to a second opening 24 at a second end 26 of the rotor shaft 14. The inner surface 16 has a tapered portion 28 that tapers radially inboard as the tapered portion 28 of the inner surface 16 extends axially away from the second end 26 of the rotor shaft 14. The rotor shaft 14 defines a plurality of ports 30 that are disposed axially between the tapered portion 28 and the second end 26 of the rotor shaft 14. The motor 12 is configured to drive rotation of the rotor shaft 14, such that a fluid 32 disposed within the hollow 18 is propelled axially away from the first end 22 of the rotor shaft 14 and through the plurality of ports 30 defined by the rotor shaft 14.

Figure 1:
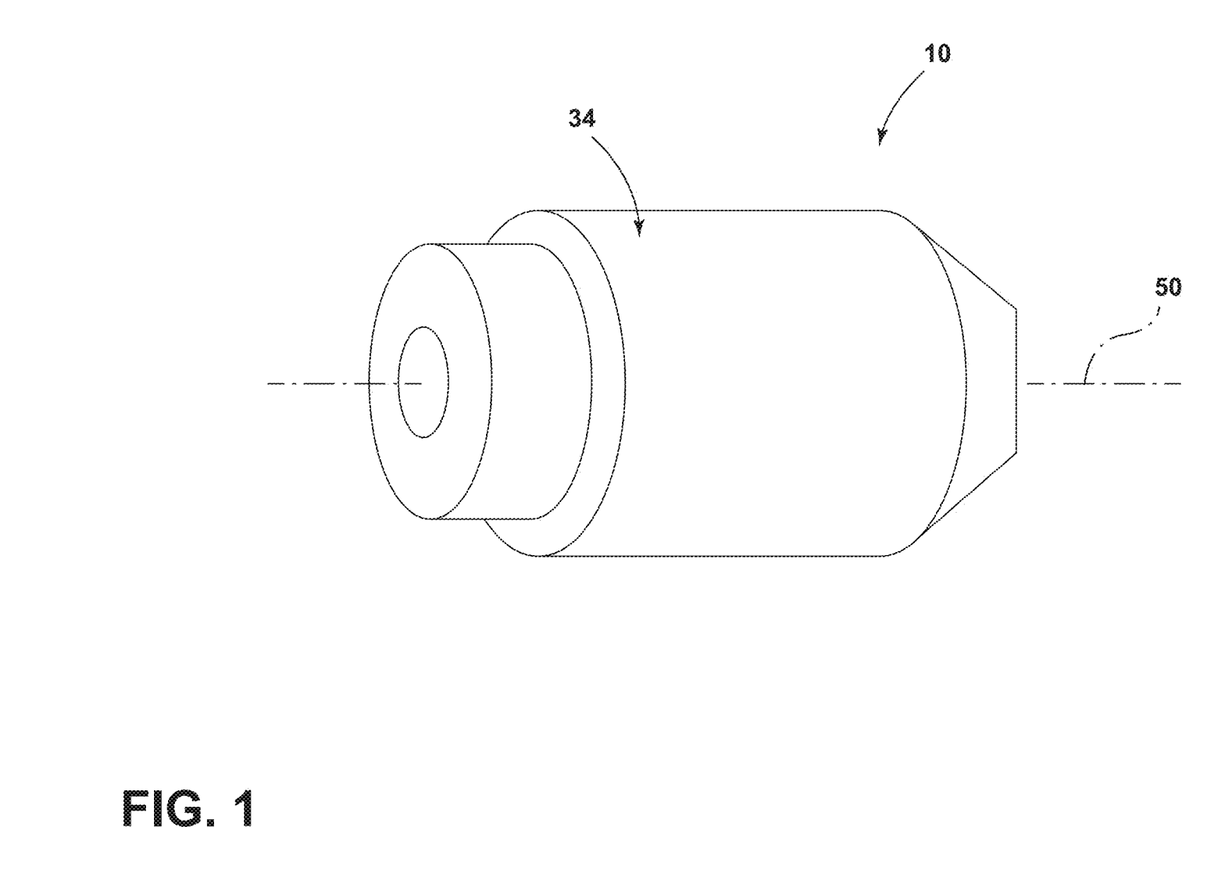
FIG. 1 is a top perspective view of a drive unit that includes a housing.
Figure 2:
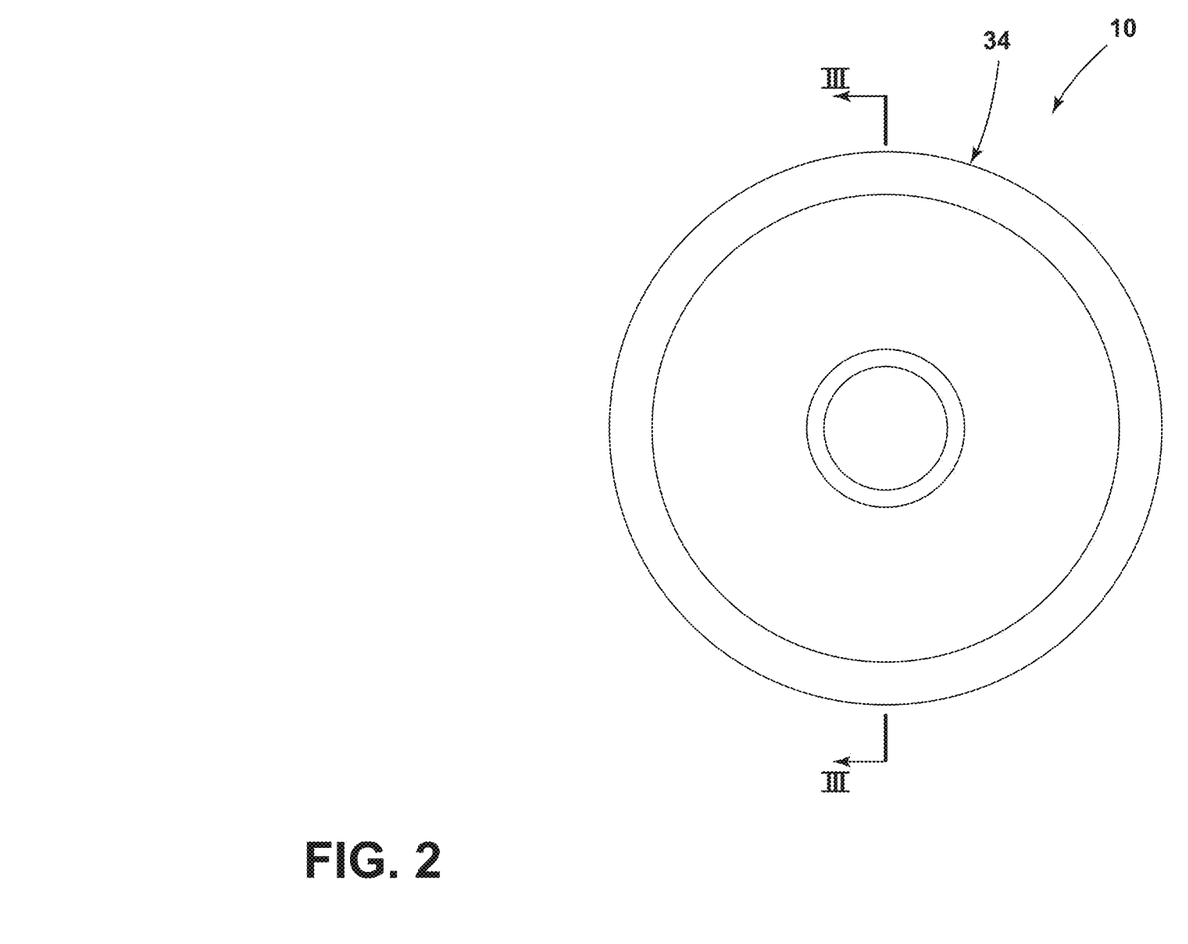
FIG. 2 is a side elevational view of the drive unit.
Figure 3:
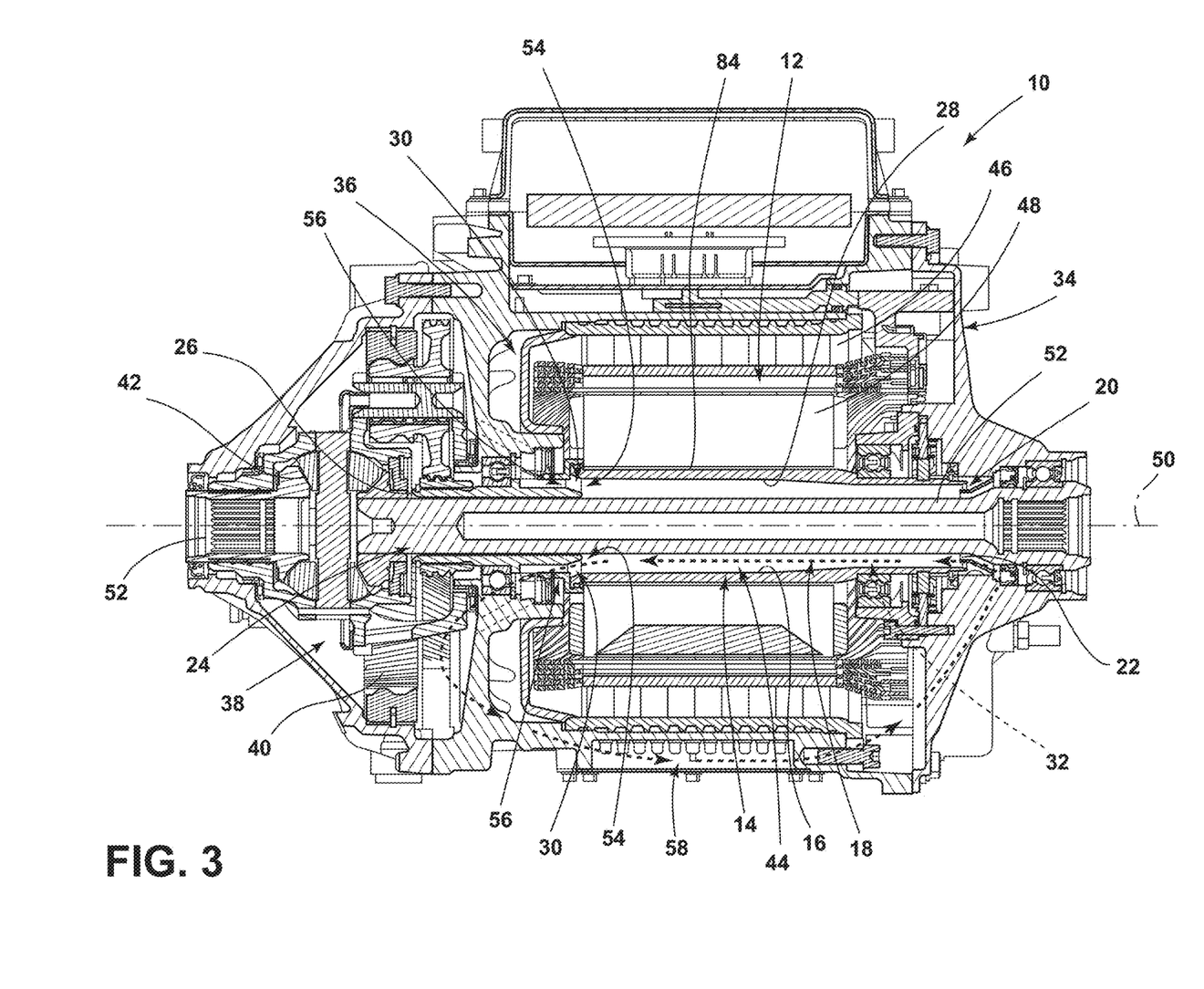
FIG. 3 is a cross-sectional view of the drive unit of FIG. 2 taken at line III-III, illustrating a rotor shaft that defines a plurality of ports and has an inner surface that includes a tapered portion.

Referring now to FIGS. 1-3, the drive unit 10 can be an electric drive unit 10. For example, as illustrated in FIG. 3, the drive unit 10 is an electric drive unit 10 that includes a motor 12, as described further herein. The drive unit 10 includes a housing 34. The housing 34 can be an assembly of a plurality of components, in some examples. For example, in the embodiment illustrated in FIG. 1, the housing 34 is a die-cast aluminum housing 34 that is formed of a plurality of components. In various embodiments, the housing 34 defines a motor housing region 36. The motor 12 of the drive unit 10 is disposed within the motor housing region 36 defined by the housing 34, as illustrated in FIG. 3. The housing 34 can further define a gearbox region 38. Components of the drive unit 10, such as a gearset 40 and a differential 42, may be disposed within the gearbox region 38 defined by the housing 34. Further, the gearbox region 38 may serve as a reservoir for fluid 32 that is utilized in the electric drive unit 10 and flows within a fluid circuit 44 of the drive unit 10, as described further herein.

Referring now to FIG. 3, the electric drive unit 10 includes the motor 12. The motor 12 includes a stator 46 and a rotor 48. The motor 12 is configured to drive rotation of the rotor shaft 14 that is positioned radially inboard of the rotor 48 about an axis 50. In various implementations, rotation of the rotor shaft 14 is configured to drive first and second output shafts 52 that are operably coupled to the rotor shaft 14 via the gearset 40 and differential 42 disposed within the gearbox region 38 defined by the housing 34. In various implementations, the drive unit 10 is utilized in a vehicle, such as an electric vehicle or a hybrid electric vehicle, and the first and second output shafts 52 are operably coupled with wheels of a vehicle, such that the drive unit 10 is a portion of an e-axle of the motor vehicle.

Figure 4:
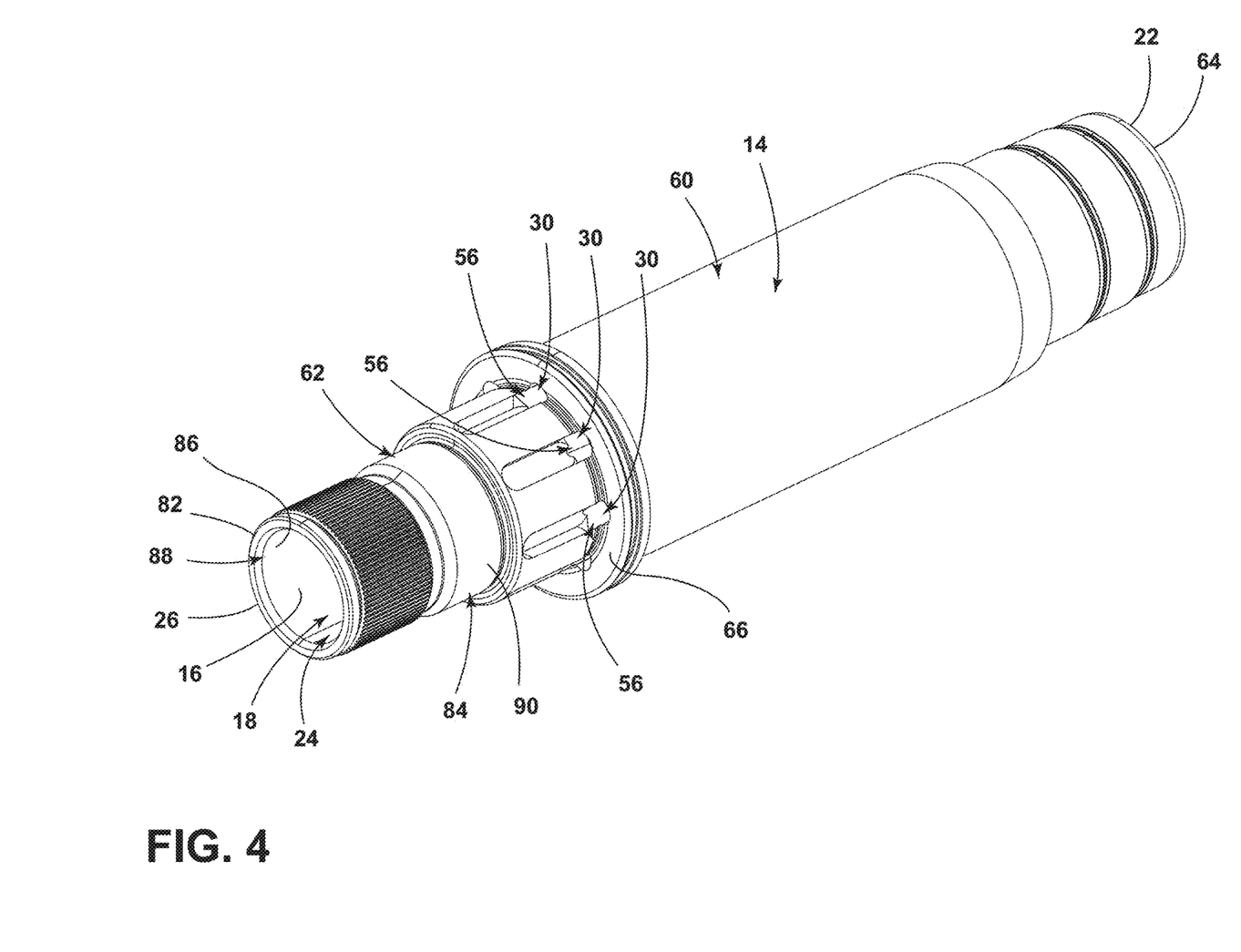
FIG. 4 is a perspective view of a rotor shaft.
Figure 5:
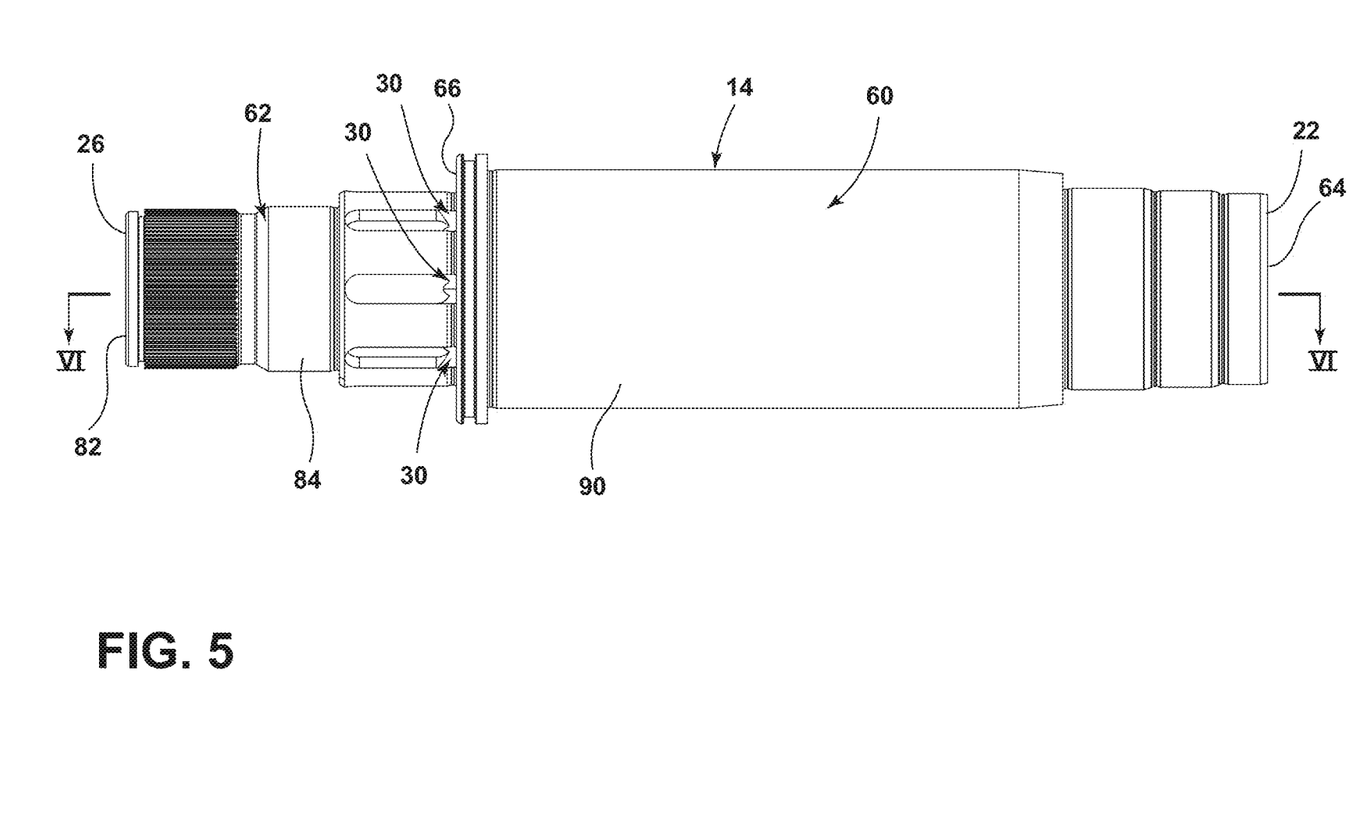
FIG. 5 is a front elevational view of a rotor shaft, illustrating a plurality of ports defined by the rotor shaft.
Figure 6:
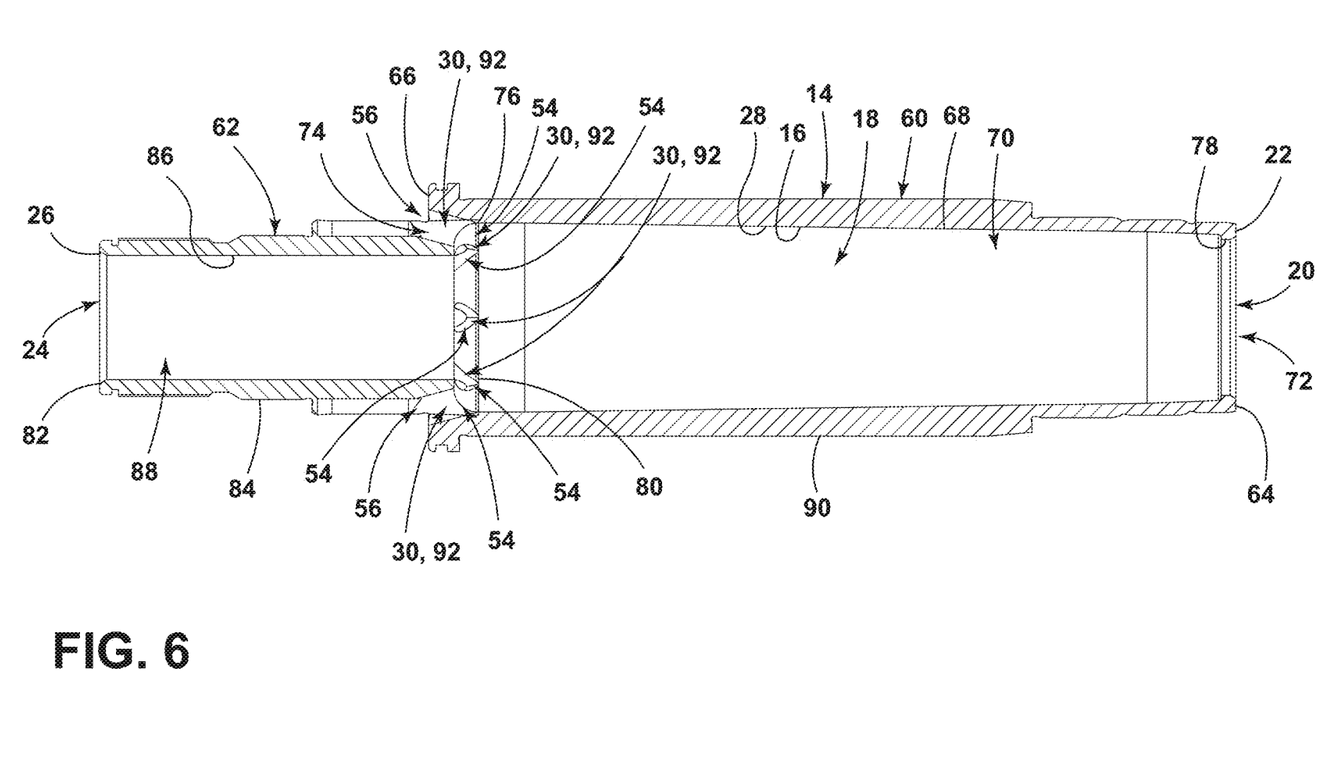
FIG. 6 is a cross-sectional view of the rotor shaft of FIG. 5 taken at line VI-VI, illustrating the plurality of ports of the rotor shaft and an inner surface of the rotor shaft that defines a hollow and includes a tapered portion.

Referring now to FIGS. 3-6, the rotor shaft 14 of the drive unit 10 extends axially from the first end 22 of the rotor shaft 14 to the second end 26 of the rotor shaft 14. As illustrated in FIG. 3, the first end 22 is further than the second end 26 from the gearbox region 38 of the housing 34. In various implementations, the rotor shaft 14 is operably engaged with the differential 42 and/or gearset 40 disposed within the gearbox region 38 defined by the housing 34 proximate to the second end 26 of the rotor shaft 14. The rotor shaft 14 extends axially away from the gearbox region 38 from the second end 26 to the distal first end 22 of the rotor shaft 14. In various implementations, the rotor shaft 14 includes the inner surface 16. The inner surface 16 of the rotor shaft 14 defines the hollow 18 of the rotor shaft 14. The hollow 18 may extend axially through the rotor shaft 14 from the first end 22 of the rotor shaft 14 to the second end 26 of the rotor shaft 14. For example, as illustrated in FIGS. 3 and 6, the hollow 18 defined by the inner surface 16 of the rotor shaft 14 extends axially from the first opening 20 at the first end 22 of the rotor shaft 14 to the second opening 24 at the second end 26 of the rotor shaft 14. As illustrated in FIG. 3, at least one output shaft 52 extends within the hollow 18 defined by the inner surface 16 of the rotor shaft 14. In the illustrated embodiment, the output shaft 52 extends through both the first and second openings 20, 24 at the first and second ends 22, 26 of the rotor shaft 14. The output shaft 52 is configured to rotate within the hollow 18 defined by the inner surface 16 of the rotor shaft 14 in operation of the drive unit 10.

Referring still to FIGS. 3-6, the rotor shaft 14 defines the plurality of ports 30. The plurality of ports 30 defined by the rotor shaft 14 are disposed axially between the first end 22 of the rotor shaft 14 and the second end 26 of the rotor shaft 14 and extend between an exterior environment of the rotor shaft 14 and the hollow 18 defined by the inner surface 16 of the rotor shaft 14. In various implementations, the hollow 18 defined by the inner surface 16 of the rotor shaft 14 and the exterior environment of the rotor shaft 14 are in fluid communication via the plurality of ports 30 defined by the rotor shaft 14. As described further herein, fluid 32 may be configured to flow out of the hollow 18 defined by the inner surface 16 of the rotor shaft 14 through the plurality of ports 30 in operation of the drive unit 10.

Referring still to FIGS. 3-6, the inner surface 16 of the rotor shaft 14 includes the tapered portion 28. The tapered portion 28 of the inner surface 16 of the rotor shaft 14 tapers radially inboard as the tapered portion 28 extends axially away from the second end 26 of the rotor shaft 14. As illustrated in FIGS. 3 and 6, the tapered portion 28 of the inner surface 16 of the rotor shaft 14 is positioned axially between the first end 22 of the rotor shaft 14 and the plurality of ports 30 defined by the rotor shaft 14. As illustrated in FIG. 6, the tapered portion 28 extends at least to inlets 54 of the plurality of ports 30 defined by the rotor shaft 14. In various implementations, the plurality of ports 30 extend from a corresponding plurality of inlets 54 that are adjacent to the hollow 18 defined by the inner surface 16 to a corresponding plurality of outlets 56 that are adjacent to the exterior environment of the rotor shaft 14, as illustrated in FIG. 6. In various implementations, the tapered portion 28 of the inner surface 16 of the rotor shaft 14 widens radially as the tapered portion 28 extends away from the first end 22 of the rotor shaft 14 and toward the plurality of ports 30 defined by the rotor shaft 14. As illustrated in FIG. 6, in some embodiments, the tapered portion 28 of the rotor shaft 14 extends along a majority of the axial length of the rotor shaft 14.

Referring now to FIG. 3, in operation of the drive unit 10, rotation of the rotor shaft 14 is configured to propel fluid 32 along the fluid circuit 44 of the drive unit 10 for the purpose of cooling and/or lubricating various components of the drive unit 10. In the exemplary embodiment illustrated in FIG. 3, fluid 32 enters the hollow 18 defined by the inner surface 16 of the rotor shaft 14 through the first opening 20 at the first end 22 of the rotor shaft 14, such that the fluid 32 is in contact with the tapered portion 28 of the inner surface 16. Rotation of the rotor shaft 14 causes the fluid 32 in contact with the tapered portion 28 to flow axially along the tapered portion 28 of the inner surface 16 away from the first end 22 of the rotor shaft 14 and toward the plurality of ports 30 defined by the rotor shaft 14. The rotational movement of the rotor shaft 14 in combination with the tapered profile of the inner surface 16 propels the fluid 32 axially toward the plurality of ports 30 via the skin effect. The fluid 32 then flows through the plurality of ports 30 and into a portion of the fluid circuit 44 of the drive unit 10 that is in the exterior environment of the rotor shaft 14. For example, in the exemplary embodiment illustrated in FIG. 3, the fluid 32 flows out of the plurality of outlets 56, through a bearing assembly, into the gearbox region 38 of the housing 34 that serves as a reservoir, through a heat exchanger chamber 58 positioned at a bottom of the drive unit 10, and back into the hollow 18 defined by the inner surface 16 of the rotor shaft 14 via the first opening 20 at the first end 22 of the rotor shaft 14.

Because the tapered profile of the tapered portion 28 of the inner surface 16 in combination with the rotational movement of the rotor shaft 14 propels the fluid 32 along the fluid circuit 44, the drive unit 10 may omit a secondary pump (not shown) that would typically be used to pump the fluid 32 along the fluid circuit 44 of the drive unit 10. In the embodiment illustrated in FIG. 3, rotation of the rotor shaft 14 propels the fluid 32 along the fluid circuit 44 without a secondary pump. In such implementations, the flow rate of the fluid 32 within the fluid circuit 44 is dependent upon the rate of rotation of the rotor shaft 14.

Referring now to FIGS. 4-8, the rotor shaft 14 can be an assembly of a plurality of components. For example, in the embodiment illustrated in FIGS. 4-8, the rotor shaft 14 includes a first shaft component 60 and a second shaft component 62. The first shaft component 60 of the rotor shaft 14 includes a first end 64 and a second end 66 opposite the first end 64 of the first shaft component 60. The first end 64 of the first shaft component 60 is the first end 22 of the rotor shaft 14, as illustrated in FIG. 6. The first shaft component 60 includes an inner surface 68 that defines a first hollow 70. As illustrated in FIG. 6, the inner surface 68 of the first shaft component 60 forms a portion of the inner surface 16 of the rotor shaft 14, and the first hollow 70 defined by the inner surface 68 of the first shaft component 60 is a portion of the hollow 18 defined by the rotor shaft 14. The first shaft component 60 of the rotor shaft 14 includes a first opening 72 that is defined at the first end 64 of the first shaft component 60 and a second opening 74 that is defined at the second end 66 of the first shaft component 60. The first opening 72 of the first shaft component 60 is the first opening 20 of the rotor shaft 14, as illustrated in FIG. 6.

In various implementations, the tapered portion 28 of the inner surface 16 of the rotor shaft 14 is a portion of the inner surface 68 of the first shaft component 60. For example, in the embodiment illustrated in FIG. 8, the inner surface 68 of the first shaft component 60 includes the tapered portion 28. In the illustrated embodiment, the tapered portion 28 of the inner surface 68 of the first shaft component 60 extends axially away from the first end 64 of the first shaft component 60 to a shelf 76 of the inner surface 68 of the first shaft component 60 that extends radially outboard from the tapered portion 28. In the illustrated embodiment, the tapered portion 28 extends away from the second end 66 of the first shaft component 60 to a lip 78 proximate to the first end 64 of the first shaft component 60 that protrudes radially inboard farther than the radially inboard-most portion of the tapered portion 28 of the inner surface 16. It is contemplated that the tapered portion 28 of the inner surface 68 of the first shaft component 60 and/or rotor shaft 14 may initiate at the first end 22 of the rotor shaft 14, in some implementations.

Referring still to FIGS. 4-8, the second shaft component 62 of the rotor shaft 14 can be coupled to the first shaft component 60, as illustrated in FIGS. 4-6. The second shaft component 62 includes a first end 80 and a second end 82 opposite the first end 80. As illustrated in FIG. 6, the second end 82 of the second shaft component 62 is the second end 26 of the rotor shaft 14. The second shaft component 62 includes an outer surface 84, and an inner surface 86 opposite the outer surface 84 that defines a second hollow 88 of the second shaft component 62. As illustrated in FIG. 6, the outer surface 84 of the second shaft component 62 is a portion of an outer surface 90 of the rotor shaft 14, the inner surface 86 of the second shaft component 62 is a portion of the inner surface 16 of the rotor shaft 14, and the second hollow 88 defined by the inner surface 86 of the second shaft component 62 is a portion of the hollow 18 defined by the inner surface 16 of the rotor shaft 14.

Referring still to FIGS. 4-8, the first shaft component 60 is coupled to the second shaft component 62 of the rotor shaft 14. In some implementations, the first and second shaft components 60, 62 are positioned relative to each other, such that a portion of the second shaft component 62 is disposed within the first hollow 70 defined by the inner surface 68 of the first shaft component 60. In the embodiment illustrated in FIG. 6, the first end 80 of the second shaft component 62 is inserted into the first hollow 70 through the second opening 74 of the first shaft component 60, such that a portion of the outer surface 84 of the second shaft component 62 is radially inboard of and axially aligned with a portion of the inner surface 68 of the first shaft component 60. As illustrated in FIG. 6, the first end 80 of the second shaft component 62 abuts the shelf 76 of the inner surface 68 of the first shaft component 60. The shelf 76 acts as a stop that obstructs axial movement of the second shaft component 62 toward the first end 64 of the first shaft component 60 during assembly of the rotor shaft 14. It is contemplated that the shelf 76 of the inner surface 68 of the first shaft component 60 may be omitted, in some embodiments of the rotor shaft 14. The first shaft component 60 and the second shaft component 62 may be fixed to each other via welding, in various implementations, as described further herein.

Figure 7:
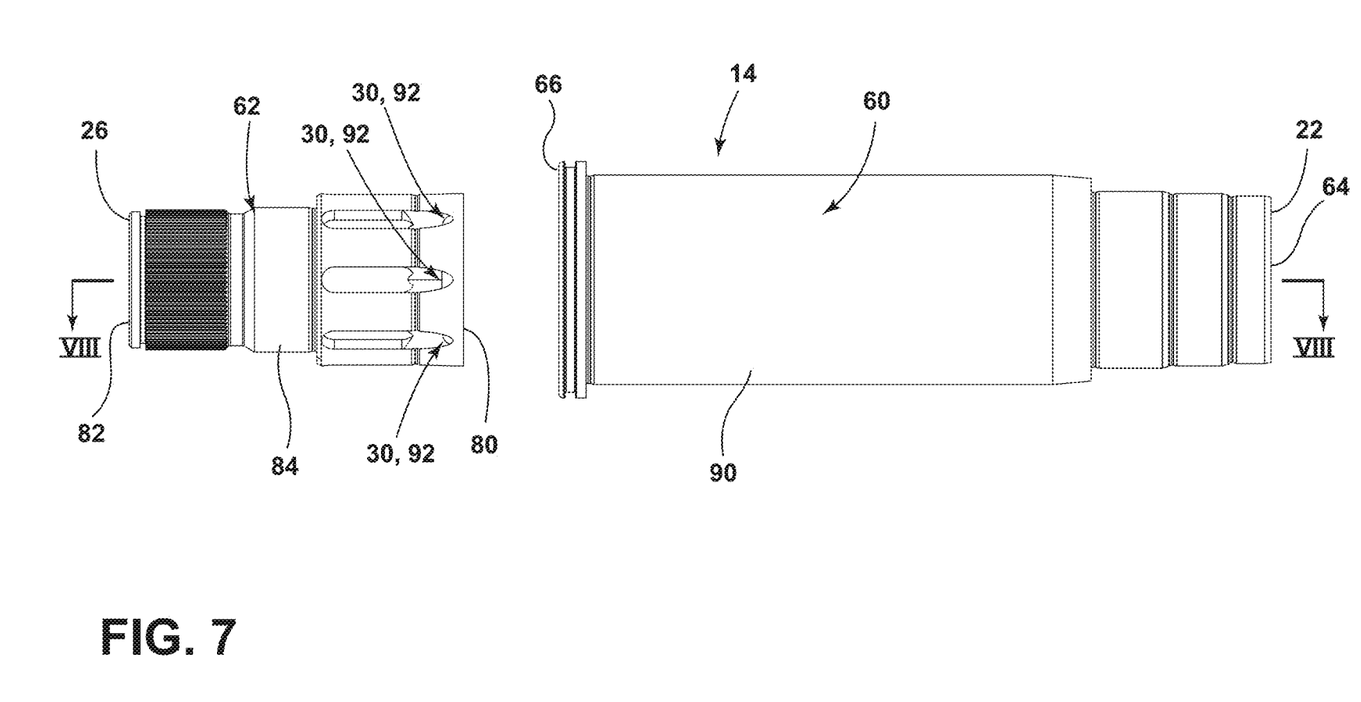
FIG. 7 is an exploded view of a rotor shaft that includes a first shaft component and a second shaft component.
Figure 8:
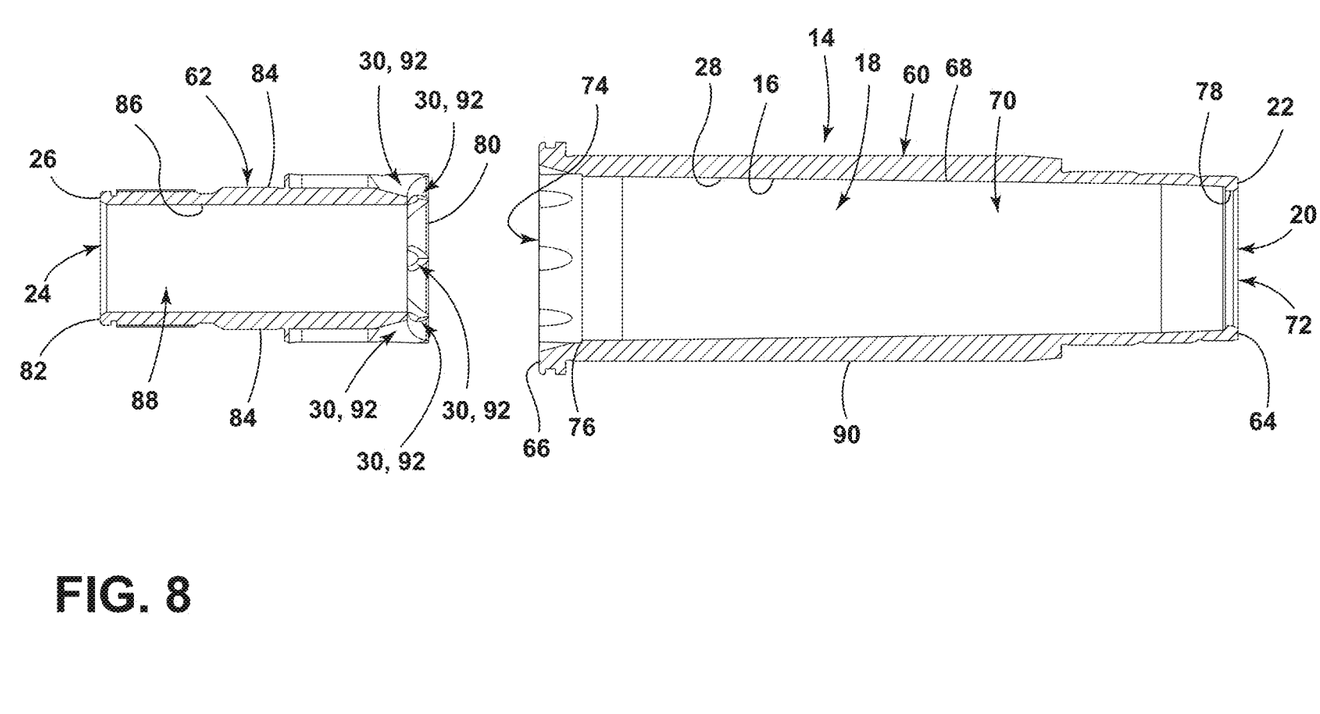
FIG. 8 is a cross-sectional view of the rotor shaft of FIG. 7 taken at line VIII-VIII, illustrating the inner surfaces of the first shaft component and the second shaft component.

Referring still to FIGS. 4-8, in various embodiments, wherein the rotor shaft 14 includes the first shaft component 60 and the second shaft component 62, the plurality of ports 30 defined by the rotor shaft 14 may be defined by the first shaft component 60 and/or the second shaft component 62. In the embodiment illustrated in FIGS. 4-8, the plurality of ports 30 are defined at least partially by the outer surface 84 of the second shaft component 62. In the illustrated embodiment, the plurality of ports 30 extend from a corresponding plurality of inlets 54 that are positioned within the first hollow 70 to a corresponding plurality of outlets 56 that are positioned outside of the first hollow 70. As such, the first hollow 70 and the exterior environment of the rotor shaft 14 are in communication via the plurality of ports 30. As illustrated in FIGS. 7 and 8, the plurality of inlets 54 of the plurality of ports 30 are apertures 92 that are defined wholly by the second shaft component 62 of the rotor shaft 14. The apertures 92 extend from the inner surface 86 of the second shaft component 62 to the outer surface 84 of the second shaft component 62. In some implementations, the plurality of ports 30 can be defined by portions of the outer surface 84 of the second shaft component 62 that are axially aligned with and radially inboard of the inner surface 68 of the first shaft component 60 and portions of the inner surface 68 of the first shaft component 60 that are axially aligned and in a spaced relationship with the aforementioned portions of the outer surface 84 of the second shaft component 62, as described in U.S. patent application Ser. No. 18/163,669, which is incorporated herein by reference. In such implementations, the inlets 54 to a port 30 may be defined at the first end 80 of the second shaft component 62, and the outlet 56 of the port 30 may be defined at the second end 66 of the first shaft component 60.

In the embodiment illustrated in FIG. 4, the first and second shaft components 60, 62 combine to define the plurality of ports 30 that are proximate to the second end 66 of the first shaft component 60. As illustrated in FIG. 4, the plurality of ports 30 are spaced apart from each other circumferentially, such that a portion of the outer surface 84 of the second shaft component 62 extends between at least two adjacent ports 30 of the plurality of ports 30. In various implementations, the second end 66 of the first shaft component 60 that defines the second opening 74 of the first shaft component 60 is welded to a portion of the outer surface 84 of the second shaft component 62 that extends between at least two adjacent ports 30 of the plurality of ports 30 to fix the second shaft component 62 to the first shaft component 60.

Figure 9:
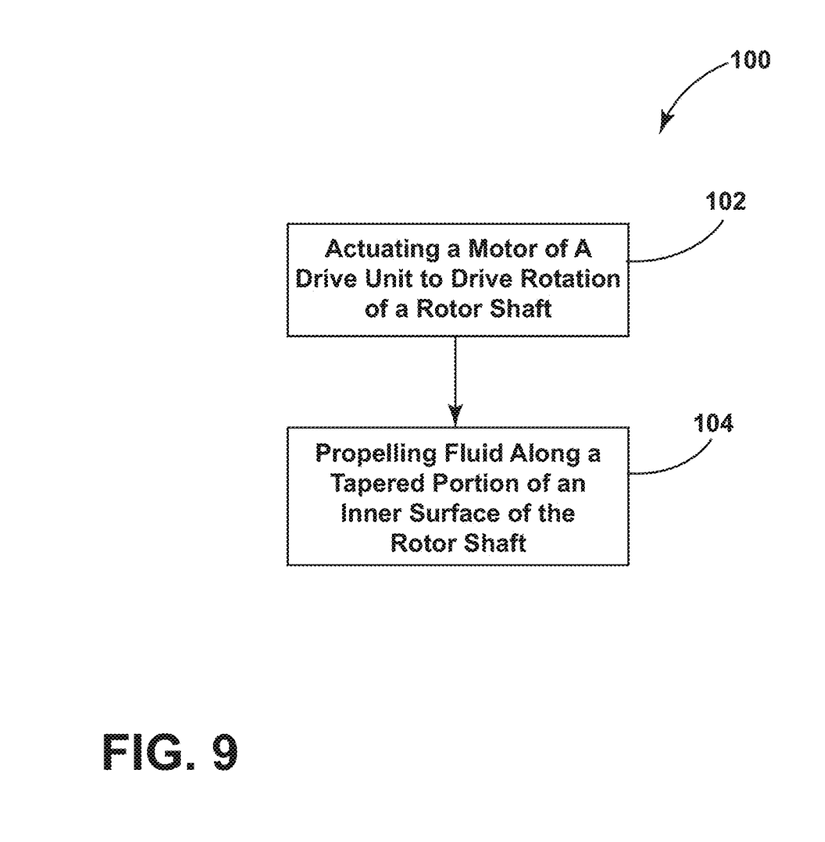
FIG. 9 is a flow diagram of a method of circulating fluid within a fluid circuit of a drive unit.

Referring now to FIG. 9, a method 100 of circulating fluid 32 within the fluid circuit 44 of the drive unit 10 may include the step 102 of actuating the motor 12. In various implementations, the step 102 includes actuating the motor 12 of the drive unit 10 to drive rotation of the rotor shaft 14. The rotor shaft 14 may include the inner surface 16 that defines the hollow 18 that extends axially from the first opening 20 of the rotor shaft 14 at the first end 22 of the rotor shaft 14 to the second opening 24 at the second end 26 of the rotor shaft 14. The inner surface 16 of the rotor shaft 14 may include the tapered portion 28 that tapers radially inboard as the tapered portion 28 of the inner surface 16 of the rotor shaft 14 extends axially away from the second end 26 of the rotor shaft 14. The rotor shaft 14 includes the plurality of ports 30 that are disposed axially between the tapered portion 28 of the rotor shaft 14 and the second end 26 of the rotor shaft 14.

The method 100 may include the step 104 of propelling fluid 32 along the tapered portion 28 of the inner surface 16 of the rotor shaft 14 axially away from the first end 22 of the rotor shaft 14 to the plurality of ports 30 via rotation of the rotor shaft 14. In various implementations, fluid 32 is propelled along the tapered portion 28 of the inner surface 16 of the rotor shaft 14 at step 104, such that the fluid 32 within the hollow 18 defined by the inner surface 16 of the rotor shaft 14 is circulated within the fluid circuit 44 of the drive unit 10. Fluid 32 may be circulated within the fluid circuit 44 of the drive unit 10 by flowing out of the hollow 18 through the plurality of ports 30 and subsequently back into the hollow 18 through the first opening 20 at the first end 22 of the rotor shaft 14. An exemplary embodiment of the fluid circuit 44 is illustrated in FIG. 3.

As described above herein, the rotor shaft 14 may include the first shaft component 60 and the second shaft component 62, and the tapered portion 28 of the inner surface 16 of the rotor shaft 14 may be a portion of the inner surface 68 of the first shaft component 60. As such, the step 104 of propelling fluid 32 along the tapered portion 28 of the inner surface 16 of the rotor shaft 14 may include propelling fluid 32 along the tapered portion 28 of the inner surface 68 of the first shaft component 60 axially away from the first end 64 of the first shaft component 60.

In some implementations of the method 100, the first end 80 of the second shaft component 62 may be disposed within the first hollow 70 defined by the first shaft component 60, and the portion of the second shaft component 62 that is disposed within the first hollow 70 at least partially defines the plurality of inlets 54 of the corresponding plurality of ports 30 defined by the rotor shaft 14. In such implementations, in the step 104 of propelling fluid 32 along the tapered portion 28 of the inner surface 16 of the rotor shaft 14 axially away from the first end 22 of the rotor shaft 14 to the plurality of ports 30 via rotation of the rotor shaft 14, the fluid 32 may be propelled into the plurality of ports 30 through the corresponding plurality of inlets 54 at least partially defined by the portion of the second shaft component 62 that is disposed within the first hollow 70 defined by the first shaft component 60.

In various implementations of the method 100, the flow rate of the fluid 32 being propelled at step 104 is dependent upon the rate of rotation that the motor 12 drives the rotor shaft 14 at step 102. For example, if the rotor shaft 14 is stationary, the fluid 32 within the fluid circuit 44 may be generally stagnant. In an exemplary embodiment, wherein the drive unit 10 does not include a secondary pump to propel the fluid 32 within the fluid circuit 44 aside from the rotor shaft 14, the rate of rotation of the rotor shaft 14 as driven by the motor 12 may dictate the flow rate of the fluid 32 within the fluid circuit 44.

The drive unit 10 and rotor shaft 14 of the present disclosure may provide a variety of advantages. First, the rotor shaft 14 being operable to propel fluid 32 along the fluid circuit 44 due to the tapered portion 28 of the inner surface 16 of the rotor shaft 14 may eliminate the need for a secondary pump to convey fluid 32 along the fluid circuit 44, which may reduce costs and the spatial footprint of the drive unit 10. Second, the rotor shaft 14 having the first shaft component 60 and the second shaft component 62 may advantageously allow for the tapered portion 28 to be machined into the appropriate axial section of the rotor shaft 14.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 drive unit
12 motor
14 rotor shaft
16 inner surface
18 hollow
20 first opening
22 first end
24 second opening
26 second end
28 tapered portion
30 ports
32 fluid
34 housing
36 motor housing region
38 gearbox region
40 gearset
42 differential
44 fluid circuit
46 stator
48 rotor
50 axis
52 output shaft(s)
54 inlets
56 outlets
58 heat exchanger chamber
60 first shaft component
62 second shaft component
64 first end
66 second end
68 inner surface
70 hollow
72 first opening
74 second opening
76 shelf
78 lip
80 first end
82 second end
84 outer surface
86 inner surface
88 hollow
90 outer surface
92 apertures
100 method
102 step
104 step

What is claimed is:

1. A drive unit, comprising:
a motor; and
a rotor shaft operably coupled with the motor, the rotor shaft having an inner surface that defines a hollow that extends axially from a first opening at a first end of the rotor shaft to a second opening at a second end of the rotor shaft and has a tapered portion that tapers radially inboard as the tapered portion of the inner surface extends axially away from the second end of the rotor shaft, the rotor shaft further defining a plurality of ports disposed axially between the tapered portion and the second end of the rotor shaft, wherein the motor is configured to drive rotation of the rotor shaft, such that a fluid disposed within the hollow is propelled axially away from the first end of the rotor shaft and through the plurality of ports defined by the rotor shaft, and wherein the rotor shaft comprises:
a first shaft component having a first end and a second end opposite the first end of the first shaft component and defining a first hollow, wherein the first end of the first shaft component is the first end of the rotor shaft and the first hollow defined by the first shaft component is a portion of the hollow defined by the rotor shaft; and
a second shaft component coupled to the first shaft component and having a first end and a second end opposite the first end of the second shaft component and defining a second hollow, wherein the second end of the second shaft component is the second end of the rotor shaft and the second hollow defined by the second shaft component is a portion of the hollow defined by the rotor shaft, and wherein the motor drives rotation of the first shaft component and the second shaft component.

2. The drive unit of claim 1, wherein the tapered portion of the inner surface of the rotor shaft is a portion of an inner surface of the first shaft component.

3. The drive unit of claim 2, wherein the tapered portion extends along a majority of the axial length of the first shaft component.

4. The drive unit of claim 3, wherein the tapered portion extends axially away from the first end of the first shaft component to a shelf of the inner surface of the first shaft component that extends radially outboard from the tapered portion.

5. The drive unit of claim 4, wherein the first end of the second shaft component abuts the shelf.

6. The drive unit of claim 4, wherein the second shaft component defines a plurality of inlets of the plurality of ports in the form of apertures defined wholly by the second shaft component.

7. The drive unit of claim 2, wherein the first shaft component further comprises:
a lip positioned between the first end of the first shaft component and the tapered portion of the inner surface of the first shaft component, wherein the lip extends radially inboard farther than the radially inboard-most portion of the tapered portion of the inner surface of the first shaft component.

8. The drive unit of claim 2, wherein the second shaft component includes an outer surface that is opposite an inner surface of the second shaft component, and a portion of the outer surface of the second shaft component is radially inboard of and axially aligned with a portion of the inner surface of the first shaft component, and the plurality of ports are defined at least partially by the outer surface of the second shaft component and extend from a corresponding plurality of inlets positioned within the first hollow to a corresponding plurality of outlets outside of the first hollow, such that the first hollow and an exterior environment of the rotor shaft are in fluid communication via the plurality of ports.

9. The drive unit of claim 8, wherein the second end of the first shaft component that defines the second opening of the first shaft component is welded to a portion of the outer surface of the second shaft component that extends between at least two adjacent ports of the plurality of ports to fix the second shaft component to the first shaft component.

10. A method of circulating fluid within a fluid circuit of a drive unit, comprising the steps of:
actuating a motor of the drive unit to drive rotation of a rotor shaft that includes an inner surface that defines a hollow that extends axially from a first opening at a first end of the rotor shaft to a second opening at a second end of the rotor shaft and has a tapered portion that tapers radially inboard as the tapered portion of the inner surface extends axially away from the second end of the rotor shaft, wherein the tapered portion extends along a majority of the axial extent of the rotor shaft, the rotor shaft further defining a plurality of ports disposed axially between the tapered portion and the second end of the rotor shaft; and propelling fluid along the tapered portion of the inner surface of the rotor shaft axially away from the first end of the rotor shaft to the plurality of ports via rotation of the rotor shaft, such that the fluid within the hollow defined by the inner surface is circulated within a fluid circuit of the drive unit by flowing out of the hollow through the plurality of ports and subsequently back into the hollow through the first opening at the first end of the rotor shaft.

11. The method of claim 10, wherein the rotor shaft comprises:
a first shaft component having a first end and a second end opposite the first end of the first shaft component and defining a first hollow, wherein the first end of the first shaft component is the first end of the rotor shaft and the first hollow is a portion of the hollow defined by the rotor shaft; and
a second shaft component having a first end and a second end opposite the first end of the second shaft component and defining a second hollow, wherein the second end of the second shaft component is the second end of the rotor shaft and the second hollow is a portion of the hollow defined by the rotor shaft, and wherein the tapered portion of the inner surface of the rotor shaft is a portion of the inner surface of the first shaft component, such that the step of propelling fluid along the tapered portion of the inner surface of the rotor shaft comprises:
propelling fluid along the tapered portion of the inner surface of the first shaft component axially away from the first end of the first shaft component.

12. The method of claim 11, wherein the first end of the second shaft component is disposed within the first hollow, and the portion of the second shaft component that is disposed within the first hollow at least partially defines a plurality of inlets of the corresponding plurality of ports defined by the rotor shaft, such that, in the step of propelling fluid along the tapered portion of the inner surface of the rotor shaft axially away from the first end of the rotor shaft to the plurality of ports via rotation of the rotor shaft, the fluid is propelled into the plurality of ports through the corresponding plurality of inlets at least partially defined by the portion of the second shaft component that is disposed within the first hollow.

13. The method of claim 10, wherein the flow rate of the fluid within the fluid circuit is dependent upon the rate of rotation of the rotor shaft.

14. The method of claim 10, wherein the drive unit does not include a secondary pump for propelling the fluid along the fluid circuit.

15. A rotor shaft for an electric drive unit, comprising:
a first shaft component that extends axially from a first end to a second end opposite the first end, the first shaft component having an inner surface that defines a first hollow that extends from a first opening defined at the first end of the first shaft component to a second opening defined at the second end of the first shaft component, the inner surface comprising:
a tapered portion that extends along a majority of the axial length of the first shaft component and tapers radially inboard as the tapered portion of the inner surface extends axially away from the second end of the first shaft component; and
a second shaft component that extends axially from a first end to a second end opposite the first end, the second shaft component having an inner surface that defines a second hollow that extends between the first end of the second shaft component and the second end of the second shaft component and an outer surface opposite the inner surface of the second shaft component that at least partially defines a plurality of ports, wherein the first end of the second shaft component is inserted into the first hollow through the second opening of the first shaft component, such that a portion of the outer surface of the second shaft component is radially inboard of and axially aligned with a portion of the inner surface of the first shaft component, and the plurality of ports defined at least partially by the outer surface of the second shaft component extend from a corresponding plurality of inlets positioned within the first hollow to a corresponding plurality of outlets outside of the first hollow such that the first hollow and an exterior environment of the rotor shaft are in fluid communication via the plurality of ports, and wherein the second end of the first shaft component that defines the second opening of the first shaft component is welded to a portion of the outer surface of the second shaft component that extends between at least two adjacent ports of the plurality of ports to fix the second shaft component to the first shaft component.

16. The rotor shaft of claim 15, wherein the tapered portion extends axially away from the first end of the first shaft component to a shelf of the inner surface of the first shaft component that extends radially outboard from the tapered portion.

17. The rotor shaft of claim 16, wherein the first end of the second shaft component abuts the shelf.

18. The rotor shaft of claim 17, wherein the second shaft component defines a plurality of inlets of the plurality of ports in the form of apertures defined wholly by the second shaft component.

19. The rotor shaft of claim 15, wherein the first shaft component further comprises:
a lip positioned between the first end of the first shaft component and the tapered portion of the inner surface of the first shaft component, wherein the lip extends radially inboard farther than the radially inboard-most portion of the tapered portion of the inner surface of the first shaft component.

* * * * *